United States Patent [19]
Vautier et al.

[11] 3,711,786
[45] Jan. 16, 1973

[54] DETERMINATION OF THE FREQUENCY OF LASER RADIATION
[75] Inventors: Philippe Jean Vautier; Jean Yves Coester, both of Paris, France
[73] Assignee: Societe Anonyme De Telecommunications, Paris, France
[22] Filed: Dec. 1, 1970
[21] Appl. No.: 93,930

[30] Foreign Application Priority Data
Dec. 5, 1969 France.................................6942107
Feb. 5, 1970 France.................................7004088

[52] U.S. Cl.................................331/44.5, 350/160
[51] Int. Cl............................................H01s 3/10
[58] Field of Search ....................331/94.5; 350/160

[56] References Cited
UNITED STATES PATENTS
3,534,292 10/1970 Cutler..............................331/94.5

Primary Examiner—William L. Sikes
Attorney—Wenderoth, Lind & Ponack

[57] ABSTRACT

A method enabling the frequency of the radiation emitted by a multi-frequency $CO_2$ laser to be determined with precision by adjusting the optical length of the resonant cavity, so as to be a multiple of the wavelengths of the two beams emitted, and so as to obtain a central dip in the power curve for one of the beams.

3 Claims, 6 Drawing Figures

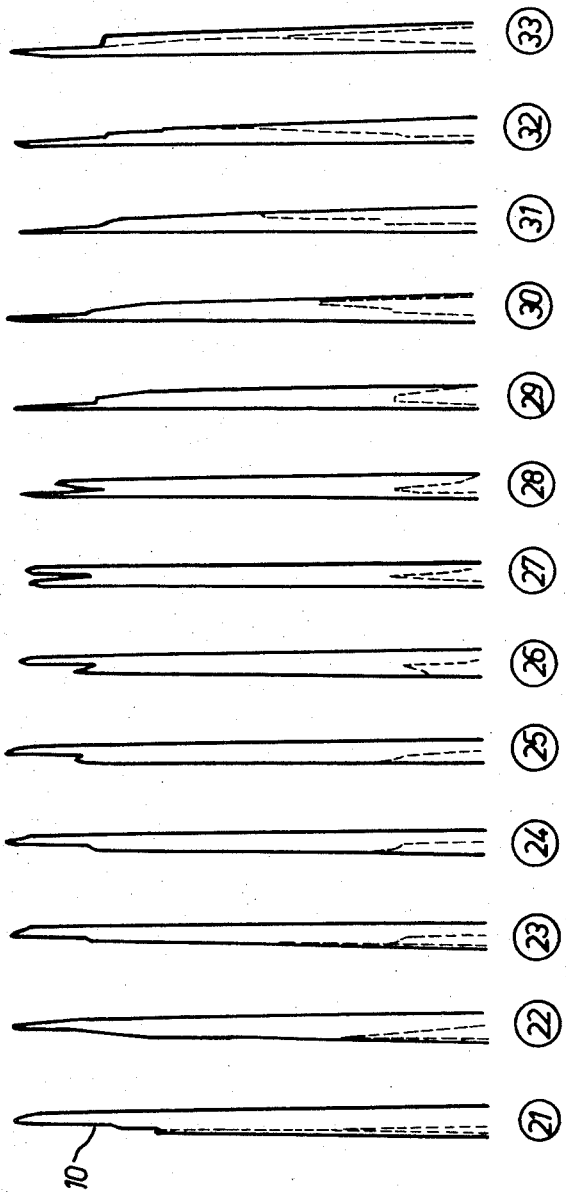

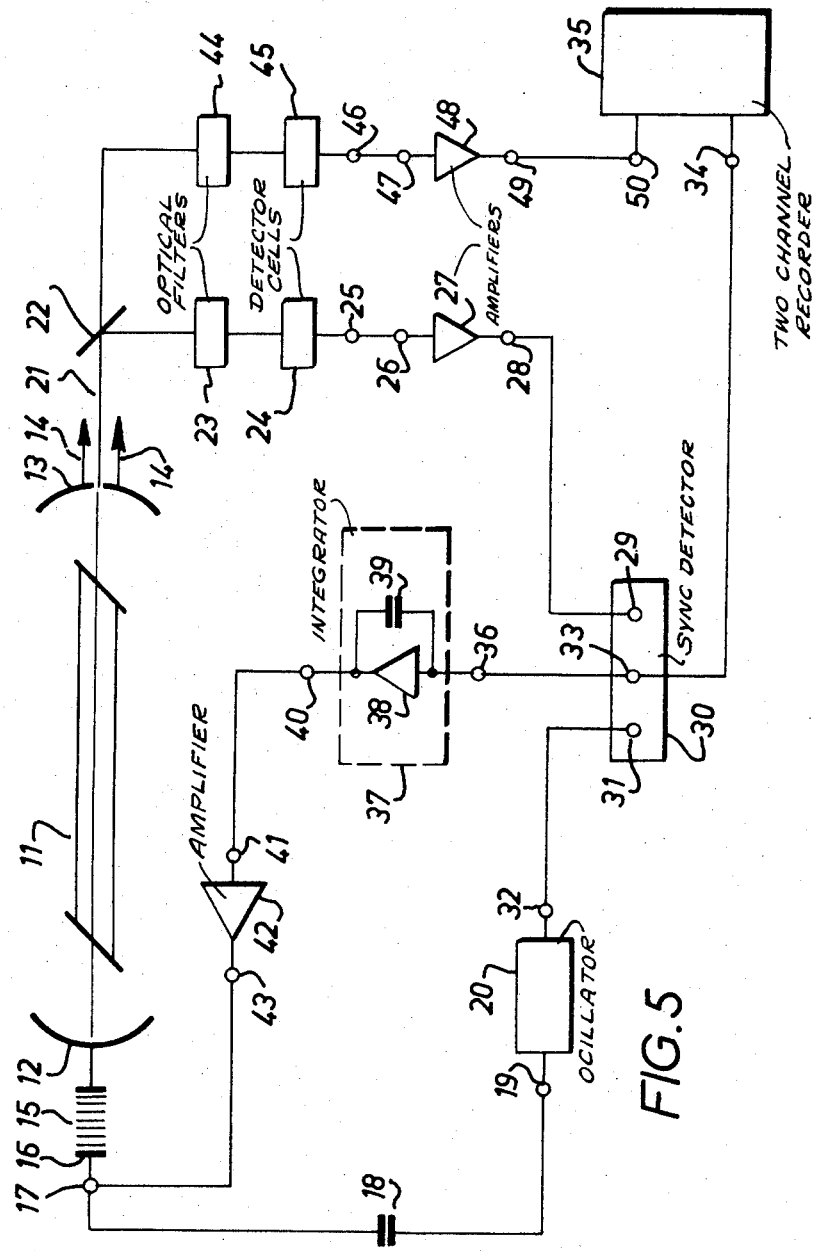

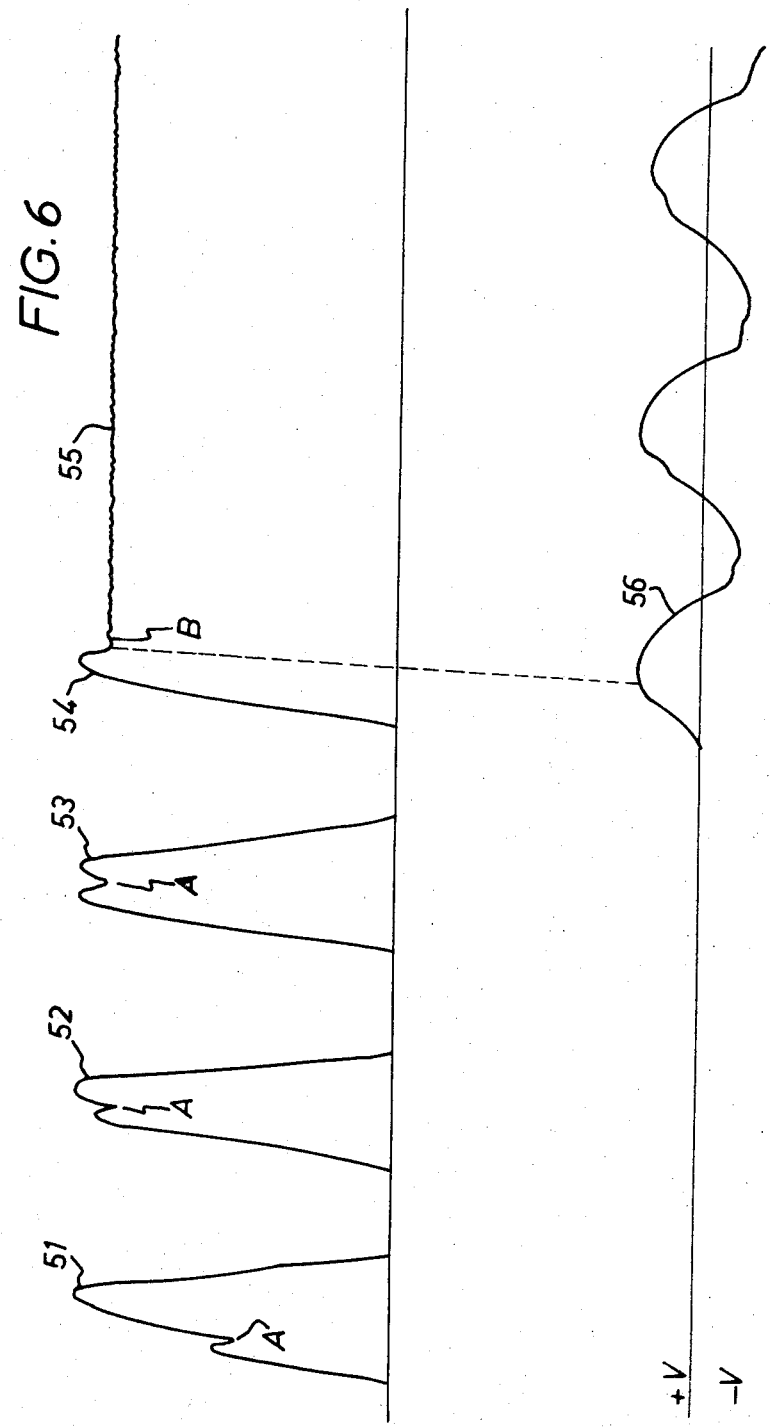

DETERMINATION OF THE FREQUENCY OF LASER RADIATION

FIELD OF THE INVENTION

The present invention relates to a method and apparatus for determining the optimum length of the resonant cavity of a carbon dioxide gas laser apparatus as a function of the wave-length selected for use from the variety of wave-lengths of which the emission from said laser apparatus may be composed, said variety being known as the multifrequency.

BACKGROUND OF THE INVENTION

It is known that the output power curve of a single-beam and single-mode laser bends downwardly, as a function of frequency, when passing through the central transition frequency. This downward bend, known as the "Lamb dip", is the subject of an article by W.E. Lamb that appeared in 1964 in Jr. Phys. Rev., No. 134, page A 1,429. Observation of this phenomenon, which is simple in a HeNe laser, requires several additional precautions in the case of the carbon dioxide gas laser. In effect, since the carbon dioxide gas laser often emits a multi-frequency radiation, the "Lamb dip" phenomenon is masked by a more clearly observable phenomenon, the observations of which formed the subject of a communication to the French Academie des Sciences during the session on 24th Nov. 1969, under the title: "Interpretation of dips observed in the profile of $CO_2$ laser beams," by Philippe Vautier, Jean Coester and Pierre Barchewitz.

In fact, the output power of the laser, recorded at a fixed wave-length, as a function of the length of the cavity, constitutes a succession of peaks at intervals of $\lambda/2$. When the laser simultaneously emits several wave-lengths, the power in each of the beams undergoes periodic variations in amplitude, and the lower the pressure within the laser and the stronger the internal field at the cavity, the more pronounced are these variations. If the wave-lengths are known, it is possible theoretically to establish the coincidence pitch of adjacent beams:

| Beam | Number of peaks | Coincidence pitch |
| --- | --- | --- |
| P14/P16 | P16: 546 peaks<br>P14: 547 peaks | 2.87 mm |
| P16/P18 | P18: 537 peaks<br>P16: 538 peaks | 2.83 mm |
| P18/P20 | P20: 529 peaks<br>P18: 530 peaks | 2.79 mm |
| P20/P22 | P22: 521 peaks<br>P20: 522 peaks | 2.76 mm |
| P22/P24 | P24: 512 peaks<br>P22: 513 peaks | 2.72 mm |

Experience confirms that these overlapping values are in accordance with the pitches arrived at theoretically.

The result of this is that, when the length L of the resonant cavity is varied, the power emitted by two laser beams having wave-lengths of $\lambda_1$ and $\lambda_2$, exhibits a series of anomalies which occur periodically and simultaneously as a function of the frequency of the two beams when the length L of the cavity is in accordance with the following relationship:

$$2nL = k_1 \lambda_1 = k_2 \lambda_2$$

$k_1$ and $k_2$ being whole numbers and $n$ the index of the resonant cavity. This relationship can, however, be extended to cover the case of the emission of several beams of different wave-length:

$$2nL = k_1 \lambda_1 = k_2 \lambda_2 = \ldots = k_i \lambda_i$$

SUMMARY OF THE INVENTION

The method of the present invention is based upon the use of this latter physical phenomenon, wherein a central dip appears in the output power/frequency curve of one of the beams of a carbon dioxide gas laser operating simultaneously with several beams each in a single mode.

The method of the present invention employs this relationship in the case of emission on two, three or more wave-lengths, associated with respective laser beams, and it is characterized in that the optical length of the resonant cavity is, on the one hand, a multiple of the wave-lengths of the laser beams generated in said cavity and, on the other hand, is adjusted in such manner as to obtain a central dip at a point between two peaks of equal amplitude in the power curve of one of the beams.

In particular, the invention enables the laser emission to be stabilized in such manner that the power emitted by one of its beams corresponds to the central dip in the power curve of this beam, stabilization being achieved by a control means in which variations in length of the resonant cavity are corrected with reference to the difference in phase detected between the variation of the length of this cavity and the corresponding modulation of the emitted laser signal. The principal advantages of the method according to the invention resides in the fact that for a given optical length of the laser apparatus, the central frequency of the emission of a laser ray is perfectly defined, account being taken of the existance of suitable pressure and excitation conditions permitting simultaneous emission of at least two adjacent laser beams.

These suitable operating conditions are as follows:

a. A low pressure in the laser enclosure such that the collision width is considerably less than the Doppler width. In these conditions the laser operates on a non-homogeneous beam, that is to say that the system is operating on the basis of one group of molecules only, among all the molecules in a state of inversion and present in the distribution curve for the molecular population as a function of the energies of the molecules. This curve, which is known as the N ($\nu$) curve, is also known as the gain distribution curve or as the molecular gain distribution curve.

b. Saturation of the gain, obtained by using strong energization associated with a minimum energy-output connection. The non-linearity of the amplifying medium limits the output power to a value which is lower when passing through the central transition frequency than at its immediately contiguous frequency zones.

c. the presence of a stationary field: the laser wave is constituted by two progressive waves having opposite wave vectors, and is made up from two groups of molecules of opposite axial velocities which each form a downward bend in the gain distribution curve, as a function of the velocities.

The $CO_2$ to which the method is applied, on the one hand fulfils the three conditions set forth above, and on the other hand is sufficiently stopped down as to function on the fundamental $TEM_{oo}$ system. The different beams can be emitted simultaneously and their power stems from a single distribution of the $N(\nu)$ populations. If the length of the cavity of a laser of this kind is altered, the relative frequency positions of the modes of the cavity and of the molecular gain vary. As a result of depopulation in the molecular gain distribution created by a plurality of beams, there is obtained, in the case of certain cavity lengths, an effect, which is similar in principle to the Lamb dip, but which differs therefrom in that it is not necessarily central and in that it is possible to fix its position as regards frequency.

The method of the present invention which makes it possible to adjust with great precision the emission of a $CO_2$ laser to suit the wave-length required, consists, after the wave-lengths $\lambda_1$ and $80_2$ have been selected, in predetermining by calculation the length L of the resonant cavity, as follows, for example:

$$2nL = k_1 \lambda_1 = k_2 \lambda_2$$

in constructing the $CO_2$ laser that fulfils the above-stated conditions and in adjusting the length of the resonant cavity so as to obtain a dip at the center of the power curve for the beam at wave-length $\lambda_1$.

These and other objects and advantages of the invention will become apparent from the following description of an embodiment with reference to the accompanying drawings, which relate to a mode of performing the method in the case of regulation of the length of the resonant cavity of a $CO_2$ laser by observing the dips in the profiles of the $P_{14}$ and $P_{20}$ beams in the $\nu_3 \longrightarrow \nu_1$ transition.

It will be recalled that $P_J$ connotes the transition that takes place between the J-1 and J energy levels, the frequency of the emitted radiation being related to the J level in question by the known formula:

$$\nu P_J = \nu_o - (2\beta/h) J,$$

in which:

$\nu_o$ is the central frequency of the transition
$\beta = 7.7 \cdot 10^{-24}$ Joule, and
h = the Planck constant.

BRIEF DESCRIPTION OF THE DRAWINGS

FIG. 2 illustrates the variations in the power curves of the $P_{14}$ and $P_{20}$ beams of the $\nu_3 \longrightarrow \nu_1$ transition when the length of the resonant cavity varies.

FIg. 5 illustrates schematically a laser apparatus with control circuits in accordance with the invention.

FIG. 6 shows curves recorded upon starting up and during the operation of the laser apparatus controlled in accordance with the invention.

DESCRIPTION OF ILLUSTRATED EMBODIMENT

Figure 1:
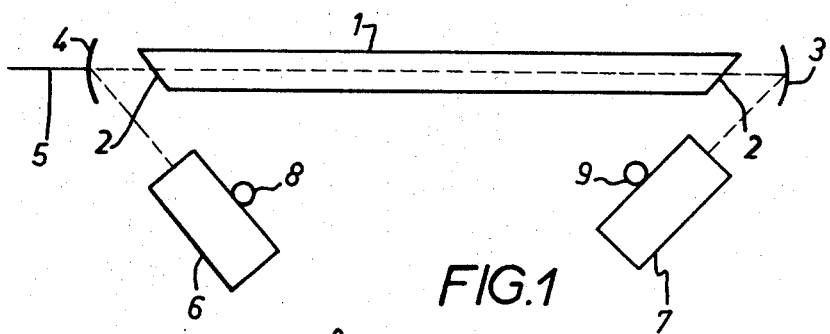
FIG. 1 illustrates laser apparatus equipped for regulation in accordance with the present invention.

The two ends of the tube 1 shown in FIG. 1 are constituted by windows 2 made of rock salt, which form an angle known as the Brewster angle with the transverse plane of the tube; a stream of carbon dioxide gas (not shown) circulates under low pressure in this tube 1. The resonant cavity is formed by two mirrors disposed perpendicularly to the axis of the tube, one of these mirrors 3 being fixed, whereas the other 4 can be slowly displaced perpendicularly to itself, as indicated by the arrow 5. Two spectrographs 6 and 7 are so positioned that they receive part of the radiation emitted in the tube 1. One of these spectrographs selects the beam having a wave-length of $\lambda_1$, and the other selects the beam having a wave-length of $\lambda_2$, and the relative power of these beams is indicated by the cells 8 and 9 which respectively detect each of these radiations.

FIG. 2 illustrates an example of the power curves for the two beams $\lambda_1$ and $\lambda_2$, as detected for example by the cells, 8 and 9, these curves being simultaneously recorded on a two-channel recorder, while the length of the resonant cavity is increased.

In this Figure, the power curve for the beam $P_{14}$, having a wave-length $\lambda_1$, is shown in solid lines and that for the beam $P_{20}$ having a wave-length of $\lambda_2$ is shown in broken lines. For a given length of the resonant cavity the power curves for the two beams $P_{14}$ and $P_{20}$ are in a given position such as that indicated by the encircled numeral 21, and it an be seen that in this position the curve for the beam $P_{14}$ has a dip at 10 which corresponds to the position of the maximum for the beam $P_{20}$. As the length of the cavity increases (towards the right in the Figure), the dip in the curve corresponding to the beam $P_{14}$ moves towards the center thereof, and on reaching the position shown by encircled numeral 27 it is precisely centered in the same way as the curve corresponding to the beam $P_{20}$. As the length of the resonant cavity continues to increase, the dip in the power curve for the beam $P_{14}$ moves to the right together with the maximum of the curve for the beam $P_{20}$, as shown in the sequence of graphs denoted by encircled numerals 27 to 33 in FIG. 2.

FIG. 2 shows that, by the method of the invention, the length of the resonant cavity can be adjusted so that the power curves for the beams $P_{14}$ and $P_{20}$ correspond to the case illustrated at 27 in this Figure. When this adjustment is made, it is then certain that the radiation emitted from the cavity closely corresponds to the two wave-lengths:

$\lambda_1 = 10.531 \mu$ for the beam $P_{14}$ $\lambda_2 = 10.590 \mu$ for the beam $P_{20}$ The method of the invention can be used whenever it is required to ascertain with precision a wave-length emitted by a multi-frequency laser apparatus.

In certain applications of laser radiation, it is particularly important to know precisely what the wave-length of the radiation is, particularly where the system is used in spectroscopy or in tele-communications. It will be observed that the radiation emitted by carbon dioxide gas lasers is within a range of wave-lengths in the vicinity of 10.6 microns. On the other hand, the length of the laser tube is generally in the order of 1 meter, that is to say $10^5$ times the wave-length of the radiation emitted, so that the stability required over the wave-length is equivalent to a stability over the length of the tube that is $10^5$ greater. A further object of the invention is to provide means for controlling the length of the laser tube such that the power emitted by one of the laser beams correspond to the central dip in the curve representing the power of this beam as a function of the length of the tube.

Figure 3:
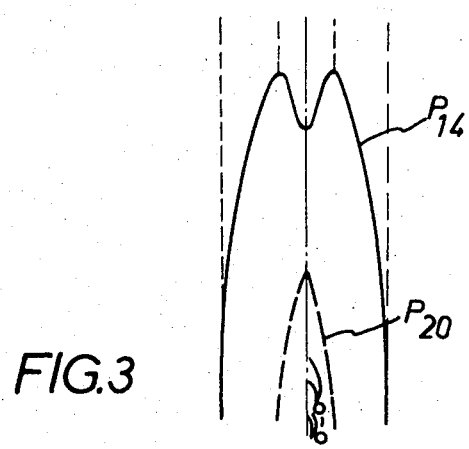
FIG. 3 illustrates, on a greater scale, the power curves of the $P_{14}$ and $P_{20}$ beams as a function of the length of the resonant cavity.

In FIG. 3 there is shown, as a solid line, the power curve for the beam $P_{14}$ for the $\lambda_3 \rightarrow \lambda_1$ transition of the carbon dioxide gas laser, while the broken line curve is that for the beam $P_{20}$ for the same transition. This curve is recorded with the help of apparatus constituted by a laser tube and two selective filters associated with two radiation detectors each tuned to the emission wavelength of one of the beams, while the resonant cavity of the laser tube is extended by displacement by one of the mirrors. During the course of this extension, the frequencies of the radiation emitted by the two beams vary as they pass through their central values $\lambda_o$ and $\lambda'_o$. At this moment, the power of the beam $P_{20}$ is at its maximum, whereas on the other hand, the power of the beam $P_{14}$ passes through a minimum at this said position. The length of the resonant cavity is held under control at this minimum which corresponds to a well-defined length of said cavity.

Figure 4:
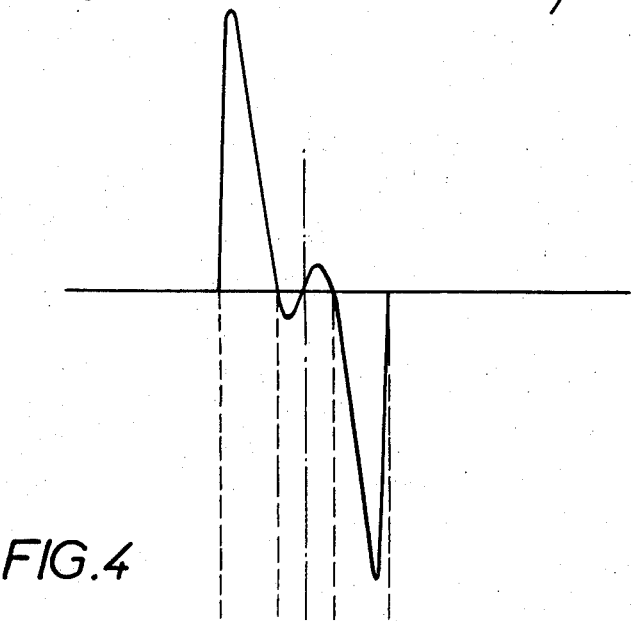
FIG. 4 shows the comparative curve for the phases of the modulated laser signal and an alternating voltage modulating the length of the resonant cavity.

The comparative phase curve shown in FIG. 4 for the modulated signal emanating from the radiation emitted by the laser on the one hand and of the A.C. voltage fed to the piezo-electric ceramic element 15 (to be described with reference to FIG. 5) on the other is positive when the two phases are of the same sign, and negative when the two phases are of opposite signs, and the value of the ordinate of this curve varies in proportion to the phase difference. The phase difference is cancelled out at the two maxima and at the minimum of the power curve shown in FIG. 3. This correspondence between the power of the signal and the phase difference is utilized in the control apparatus illustrated in FIG. 5.

In FIG. 5, the laser tube 11, together with the two mirrors 12 and 13, constitutes the resonant cavity of the apparatus. The mirror 13 is movable and can be displaced slowly axially while remaining parallel to itself as indicated by the arrow 14, whereas the mirror 12, which is also movable, is mounted on a piezo-electric ceramic element 15, the end 16 of which is fixed and the length of which varies as a function of the voltage applied to its feed terminal 17. This feed terminal 17 is connected, by means including a condenser 18, to an output terminal 19 of an oscillator 20, the output frequency of which is 475 cycles per second, for example. This A.C. voltage imparts, through the intermediary of the piezo-electrical ceramic element 15, a reciprocating movement to the mirror 12 and consequently modulates the laser radiation emitted in the resonant cavity at the same frequency, i.e. 475 c.p.s., again using the example selected.

The mirror 13, containing a hole at its center enables the laser beam 21 to pass out of the cavity, this beam being divided into two parts by a semi-reflecting mirror 22. A first part of said beam passes through the optical filter 23, on the outlet side of which the filtered radiation strikes the sensitive surface of a detector cell 24, the output terminal 25 of which, receiving a voltage which is a function of the laser energy and is modulated at the same frequency as this, is connected to the input terminal 26 of the amplifier 27, the output terminal 28 of which is connected to the input terminal 29 of a synchronous detector 30. Said synchronous detector 30, through its second input terminal 31, connected to the output terminal 32 of the oscillator 20, receives as a reference the modulation frequency, i.e. 475 c.p.s. in the example selected. A voltage, the sign of which is positive when the two input voltages are of the same phase, and negative when the same input voltages are of opposite phase, and the amplitude of which is proportional to the adjustment that is to be made to the length of the resonant cavity, is received at the output terminal 33 of this synchronous detector 30, which terminal is connected on the one hand to the first input terminal 3 of a two-channel recorder 45, and on the other, to the input terminal 36 of an integrator 37. The integrator 37 consists of an amplifier 38 shunted by a capacitance 39. The output terminal 40 of the integrating circuit 37 is connected to the input terminal 41 of an amplifier 42, the output terminal 43 of which is connected to the feed terminal 17 of the piezo-electric ceramic unit 15.

For stating up and controlling the apparatus of the invention, use is made of the second portion of the laser beam 21, i.e. the portion which passes through semi-reflecting mirror 22. Said second portion passes through the optical filter 44 and strikes the sensitive face of the detector cell 45. The output terminal 46 of said detector cell is connected to the input terminal 47 of an amplifier 48, the output terminal 49 of which is connected to the second input terminal 50 of the two-channel recorder 35.

The curve for the power emanating from the laser emitter is thus recorded in this second channel of the recorder as a function of time, whereas the output voltage curve of the synchronous detector 30 is recorded in the first channel of the same recorder. FIG. 6 shows, by way of example, two curves as recorded on the recorder 35.

When the apparatus in accordance with the invention is started up, only the second terminal of the recorder is operative. When the mirror 13 is displaced in a uniform manner in the direction of the arrows 14, the curve for the power of the laser emission, corresponding to the beam $P_{14}$ of the $\lambda_3 \rightarrow \lambda_1$ transition, as a function of the length of the resonant cavity, is recorded in said second channel. In this way, there are obtained curves 51, 52 and 53 of FIG. 6, in which curves can be observed the displacement of the dip A to the right and the centering of said dip on the curve 53 when the length of the cavity increases. As explained above, the emission frequency is then accurately known, and it is then particularly desirable to set the length of the resonant cavity at this precise moment.

The movement of the mirror 13, which has been used to effect coarse adjustment of the length of the cavity, is stopped; a sawtooth voltage, varying regularly between $-1,500$ and $+1,500$ volts for example, is then applied to the feed terminal of the piezo-electrical ceramic unit 15 by way of the synchronous detector 30, brought to the fine adjustment position. An automatic switching arrangement provides for movement from the fine adjustment position to the control position when the curve 54 reaches its central minimum at B. This switching action on the one hand stabilizes the sawtooth voltage at its momentary value and, on the other hand, brings the oscillator 20 and the control-loop system into operation.

Thereafter, two curves are registered in the two channels of the recorder: curve 55, representing slight variations in the power of the laser emission stabilized in accordance with the invention is recorded in the second channel, and curve 56, representing variations in the D.C. voltage applied to the feed terminal of the piezo-electrical ceramic unit is recorded in the first channel.

The method can be used with molecular gas and multi-frequency lasers, by limiting the laser emission to two or three beams.

We claim:

1. A method for selectively stabilizing a multi-frequency laser at one or more preselected frequencies wherein said laser emits a plurality of beams each having a corresponding frequency, wavelength and power curve, the method comprising selecting at least two of said plurality of beams, adjusting the optical length of the resonant cavity of said laser to a length substantially equal to the value L where L is defined by the equation:

$$2nL = k_1\lambda_1 = k_2\lambda_2 = \ldots = k_i\lambda_i$$

where $k_1, k_2 \ldots k_i$ are whole numbers $>0$;

$\lambda_1, \lambda_2 \ldots \lambda_i$ are the preselected wavelengths;

$n$ is the index of refraction of the resonant cavity;

so that a central dip occurs at a point between two peaks of equal amplitude in the most energetic of said power curves associated with said selected beams, utilizing said point as a reference point, monitoring the output of said laser to detect any shift of said dip from said reference point, and further adjusting said optical length so that said dip is maintained at said point.

2. A method for selectively stabilizing a multi-frequency laser at one or more preselected frequencies wherein said laser emits a plurality of beams each having a corresponding frequency, wavelength and power curve, the method comprising selecting at least two of said plurality of beams, adjusting the optical length of the resonant cavity of the laser to a length approximately equal to the value L where L is defined by the equation:

$$2nL = k_1\lambda_1 = k_2\lambda_2 = \ldots = k_i\lambda_i$$

where $k_1, k_2 \ldots k_i$ are whole numbers $>0$;

$\lambda_1, \lambda_2 \ldots \lambda_i$ are the preselected wavelengths;

$n$ is the index of refraction of the resonant cavity;

so that said power curves of said selected beams appear at the same time, monitoring the power curve of the most energetic of said selected beams, cyclically modulating the optical length of said resonant cavity, cyclically modulating the laser emission, detecting the phase difference between these two modulations, deriving a signal from said phase difference, using said signal for further adjusting said optical length to an operating point which corresponds to the minimum of a dip appearing in the power curve of said most energetic beam, and regulating by means of said optical length of said resonant cavity for stabilizing said laser at said operating point, whereby said laser is stabilized at said preselected frequencies.

3. The method according to claim 2 wherein said further adjusting step of the optical length of the cavity is made such as to obtain a central dip in said power curve of said most energetic selected beam at a point between peaks of equal amplitude and to maintain the operating point of the laser at said point.

* * * * *